United States Patent
Chen et al.

(10) Patent No.: US 6,526,523 B1
(45) Date of Patent: Feb. 25, 2003

(54) KERNEL STREAMING TEST METHOD AND SYSTEM

(75) Inventors: Yue Chen, Bellevue, WA (US); Costin Hagiu, Bellveue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/179,647

(22) Filed: Oct. 27, 1998

(51) Int. Cl.[7] .................................................. H02H 3/05
(52) U.S. Cl. ......................................................... 714/38
(58) Field of Search ............................. 714/38, 39, 47, 714/37; 703/22; 717/4, 8

(56) References Cited

U.S. PATENT DOCUMENTS

| | | | |
|---|---|---|---|
| 5,475,843 A | * 12/1995 | Halviatti et al. | 395/704 |
| 5,530,861 A | * 6/1996 | Diamant et al. | 705/8 |
| 5,555,418 A | * 9/1996 | Nilsson et al. | 709/305 |
| 5,651,111 A | * 7/1997 | McKeeman et al. | 714/38 |
| 5,715,461 A | * 2/1998 | Yoshitomi | 395/710 |
| 5,790,117 A | * 8/1998 | Halviatti et al. | 345/33.3 |
| 5,892,947 A | * 4/1999 | DeLong et al. | 395/701 |

\* cited by examiner

Primary Examiner—Dieu-Minh Le
(74) Attorney, Agent, or Firm—Banner & Witcoff, Ltd.

(57) ABSTRACT

A method and system for testing software filters used in a multimedia environment to support kernel streaming. In a computer, a source module generates a data stream in order to emulate a multimedia input device, such as a microphone or video camera. A plurality of software filters are communicatively coupled to form a software filter chain. The chain of software filters receives the data stream from the source module and propagates the data stream through each software filter for processing. An analysis module receives the processed data stream from the chain of software, filters and produces performance information as a function of the received data stream. The source module, the analysis module and each software filter operate in a kernel-mode and are configured by a test tool operating in non-kernel mode. Via the test tool, a user can select appropriate source and analysis modules as well as construct the chain of software filters to include a large number of software filters. In order to assess the functionality of a large number software filters under real-world conditions using a single computer, the invention couples the software filters by one or more virtual circuits that route the data stream to and from a network.

27 Claims, 4 Drawing Sheets

KERNEL STREAMING TEST METHOD AND SYSTEM

FIELD OF THE INVENTION

This invention relates generally to software testing, and more particularly to a method and system for testing software filters used for kernel data streaming in a multimedia environment.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

BACKGROUND OF THE INVENTION

Typical multimedia systems include software modules, known as filters, that capture, transform and render streams of data. The performance of a multimedia system often hinges upon the system's ability to quickly and accurately process large volumes of data using these software filters. In conventional systems, software filters are executed by software components executing in non-kernel mode. In order to manipulate the data, each filter often communicates the data to a device driver operating in kernel mode. Each transition by the data stream from a component executing in non-kernel mode to a component executing in kernel mode is time consuming and introduces latencies. For this reason, Microsoft introduced the concept of kernel streaming. In kernel streaming, each software filter is executed in kernel mode and is controlled by a generic software interface known as a proxy filter. As a result, the data stream need not transition from a component operating in kernel mode to a component operating in non-kernel mode. The proxy filters allow applications to communicate with the respective software filter without passing the actual data stream.

One of the difficulties in developing robust software filters for kernel streaming is that some of the filters are required to support large volumes of simultaneous data streams. For example, the Raw Channel Access (RCA) filter must support thousands of streams simultaneously over various network connections. Conventional techniques for testing software filters required the developer to configure a number of computing systems and manually test each stream. More specifically, the developer configures the test system such that one computer broadcasts a data stream while another computer receives the data stream and outputs the data using a conventional multimedia output device such as a speaker. This manual technique does not lend itself to testing many of the software filters used in kernel data streaming.

For the reasons stated above, and for other reasons stated below which will become apparent to those skilled in the art upon reading and understanding the present specification, there is a need in the art for a method that accurately tests the functionality of software filters used in kernel streaming. There is also a need for such a technique that is readily scalable for testing software filters that must simultaneously support large volumes of data streams without requiring the use of multiple computers.

SUMMARY OF THE INVENTION

The above-mentioned shortcomings, disadvantages and problems are addressed by the present invention, which will be understood by reading and studying the following specification. To solve these problems, the invention provides a test method and computing system to facilitate testing the functionality and performance of software filters used to support kernel data streaming in a multimedia environment. A software component, referred to as a source module, produces an audio and/or video data stream designed to emulate a unique multimedia device such as a microphone or video camera. One or more software filters are communicatively coupled between the source module and an analysis module. The analysis module is designed to receive and analyze a data stream that is produced by the source module and is routed through the software filters for processing. The analysis module represents a video or audio output device (e.g., a speaker), but additionally quantitatively measures the rendered data stream in order to determine whether the software filters have operated properly.

In order to assess the functionality of the software filters under real-world conditions, and to facilitate testing large numbers of data streams, the invention communicatively couples the software filters via one or more virtual circuits that route the data stream to and from a network. The invention describes systems, computing methods and computer-readable media of varying scope. In addition to the aspects and advantages of the invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings that form a part hereof and, which show by way of illustration, specific exemplary embodiments in which the invention may be practiced. These embodiments are described in sufficient detail to enable those skilled in the art to practice the invention. It is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a detailed description of various embodiments for testing software filters according to the invention is presented. In the third section, methods for operating an exemplary embodiment of the invention are provided. Finally, in the fourth section, a conclusion of the detailed description is provided.

Hardware and Operating Environment

Figure 1:
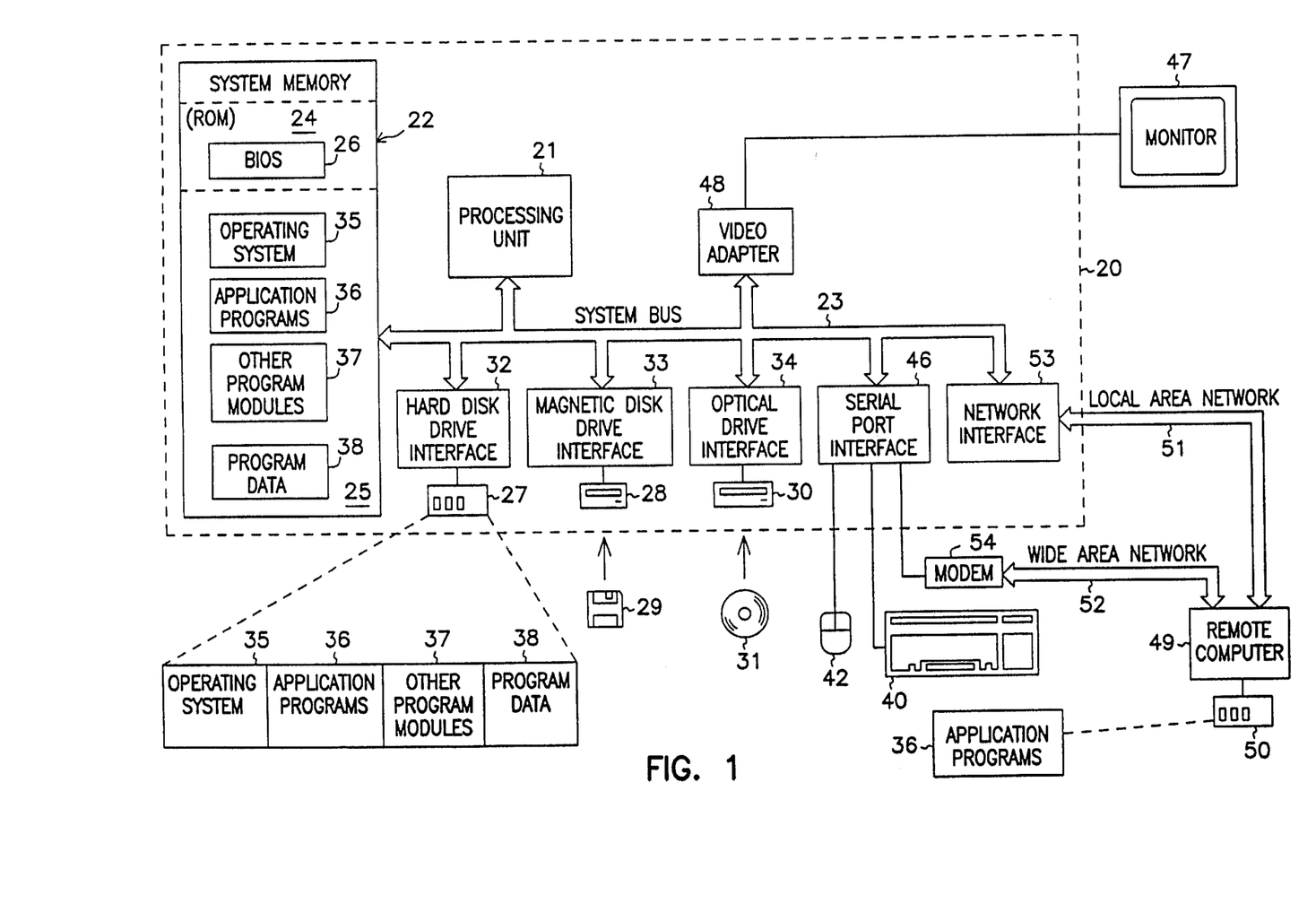
FIG. 1 shows a diagram of the hardware and operating environment in conjunction with which embodiments of the invention may be practiced.

FIG. 1 is a diagram of hardware and operating environment with which various embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20 having processing unit 21, system memory 22, and system bus 23 that operatively couples various system components including system memory 22 to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. Basic input/output system (BIOS) 26 contains routines that help to transfer information between elements within computer 20, such as during start-up, and is stored in ROM 24. Computer 20 further includes hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored by hard disk 27, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to processing unit 21 through serial port interface 46 that is coupled to the system bus, but may be connected by other interfaces, such as a parallel port, game port, or a universal serial bus (USB). Monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
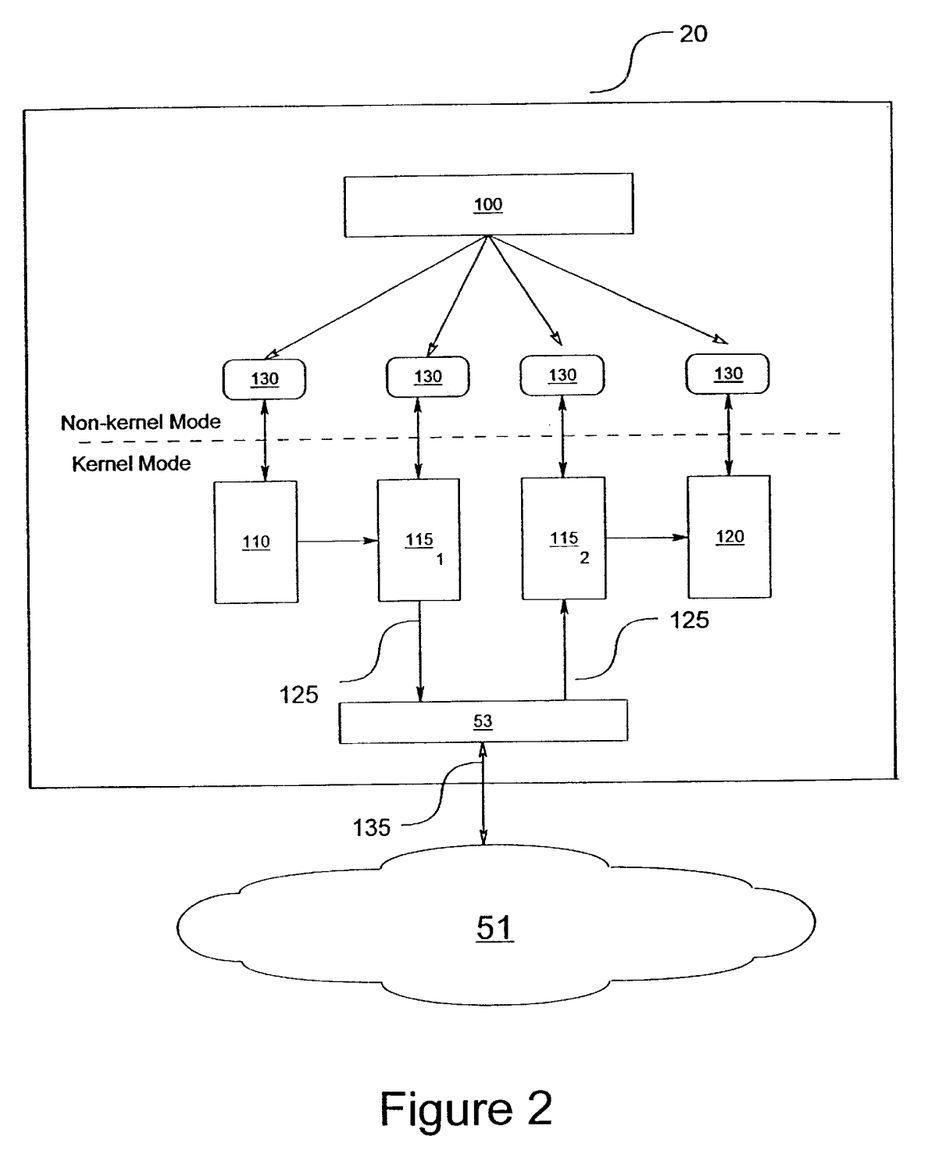
FIG. 2 is a block diagram illustrating one embodiment of a computing system for testing software filters used in kernel data streaming according to the invention.

FIG. 2 is a block diagram illustrating one embodiment of a computing system for testing software filters used for kernel data streaming according to the invention. More specifically, computer 20 includes several cooperating software components: test tool 100, proxy filters 130, source module 110, a pair of software filters 115 and analysis module 120. Computer 20 is capable of kernel streaming such that test tool 100 and proxy filters 130 execute in non-kernel mode while source module 110, software filters 115 and analysis module 120 execute in kernel mode.

Test tool 100 allows a user to configure the software components of computer 20 in order to verify and analyze their kernel streaming functionality. Using test tool 100, the user can select one or more software filters 115 for testing from a plurality of software filters. Each software filter 115 may be any filter suitable for processing a multimedia data stream such as a Raw Channel Access (RCA) filter, a modem filter and an IP conference filter. A RCA filter streams multimedia data over connection-oriented networks such as Asynchronous Transfer Mode (ATM) network and Integrated Services Digital Network (ISDN). A modem filter supports streaming over a digital or an analog modem. An IP conference filter streams multimedia data over an IP protocol based network such as the Internet.

More specifically, a user selects software filter $115_1$ that is any suitable software filter, such as a RCA Render filter, capable of processing data stream 125 generated by source module 110 to emulate a multimedia input device such as a microphone or video camera. Software filter 115, processes data stream 125 by rendering data stream 125 for output by a typical multimedia output device such as a speaker or video display device. The user further selects software filter $15_2$ that is the logical complement of software filter $115_1$. Software filter $15_2$ receives the rendered data stream and converts the data stream back into raw data representing data captured by a multimedia input device.

After selecting software filters 115 with test tool 100, the user selects an appropriate source module 110 and analysis module 120 for assessing the performance of software filters 115. Test tool 100 communicatively couples the selected software filters 115 with source module 110 and analysis module 120 to create data stream 125. Test tool 100 controls and interfaces with source module 110, software filters 115 and analysis module 120 via a corresponding proxy filter 130. Proxy filters 130 are generic interface components that allow test tool 100 to transparently control source module 110, software filters 115 and analysis module 120 without requiring that data stream 125 transition between kernel mode and non-kernel mode software components.

Source module 110 and analysis module 120 are designed to facilitate testing the functionality and performance of software filters 115. Source module 110 produces an audio and/or video data stream that emulates a unique multimedia device. For example, source module 110 may emulate a DVD player by generating properly formatted data representing the audio and video signals. Alternatively, source module 110 may emulate any multimedia data source such as a MPEG codec, a microphone, a video camera, etc. Via proxy filters 130, test tool 100 couples source module 110 directly to software filter $115_1$ such that data stream 125 generated by source module 110 passes directly to software filter $115_1$ without transitioning to a non-kernel mode software component.

After coupling source module 110 and software filter $115_1$, test tool 100 creates and couples software filter $115_2$ and analysis module 120. Analysis module 120 receives and analyzes data stream 125 to determine whether software filters 115 have operated properly. For example, in one embodiment analysis module 120 examines the following data characteristics: (1) throughput, (2) data loss rate, (3) data integrity, (4) latency, (5) compatibility and (6) negative cases handling. The throughput measures how fast the software filters 115 can process data frames of data stream 125. The data loss rate measures what percent of the data frames have been lost by software filters 115. In the non-stress situations, this percentage should be near zero. The data integrity ensures that the received data frames are neither corrupted nor duplicated. The latency measures the minimum, maximum and standard deviation delays introduced by software filters 115. The compatibility verifies that software filters 115 work properly with different data formats by emulating these data formats with source module 110. The negative cases handling ensures that software filters 115 handle bad data frames properly such as when software filters 115 unexpectedly receive very long data frames.

In order to assess the performance of software filters 115 under realistic conditions, test tool 100 establishes virtual circuit 135 between software filter $115_1$ and software filter $115_2$ and configures virtual circuit 135 and network interface 53 to operate in loop-back mode. Generally, a virtual circuit is a network connection between two devices that acts as though it is a direct connection. Often, a virtual circuit describes a connection in a packet-switching network and allows the two devices to communicate as if a dedicated connection existed even though the data packets may travel through different routes. Here, virtual circuit 135 allows software filter $115_1$ and software filter $115_2$ to communicate as if existing on separate computers. More specifically, data stream 125 generated by source module 110 flows to software filter $115_1$, through network interface 53 and out to network 51 via virtual circuit 135. Because virtual circuit 135 and network interface 53 are operating in loop-back mode, network 51 routes data stream 125 back to software filter $115_2$ via virtual circuit 135 and network interface 53.

The described technique introduces actual network delays and errors without requiring the use of multiple computers 20. To further simulate real-world conditions, test tool 100 allows a user to configure source module 110 to generate different data block sizes at different data rates. Software filters 115 are easily tested with a variety of data streams by simply configuring test tool 100 to systematically swap source module 110 and analysis module 120 with other source modules and analysis modules. Similarly, test tool 100 is configured to systematically change software filters 115 in order to test the performance of a variety of kernel-mode filters.

Figure 3:
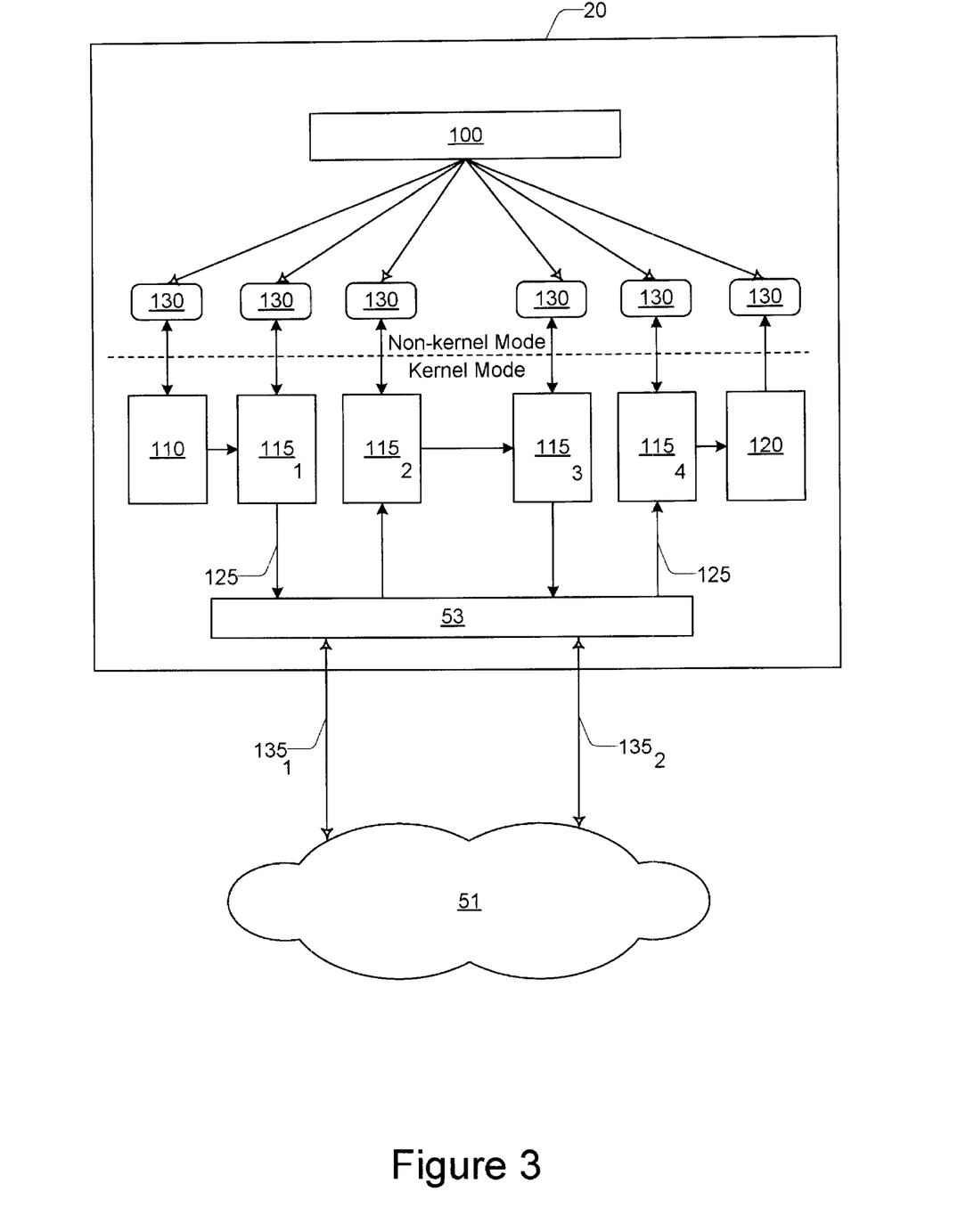
FIG. 3 is a block diagram illustrating another embodiment of a computing system for testing software filters used in kernel data streaming according to the invention.

FIG. 3 is a block diagram illustrating another embodiment of a computing system for testing software components according to the invention. As illustrated in FIG. 3, test tool 100 is capable of testing software filters that are used in kernel streaming and must support large numbers of simultaneous data streams. For example, test tool 100 allows a user to test a Raw Channel Access (RCA) filter that must support thousands of streams simultaneously over various network connections. In order to test such filters, the user selects one or more software filters 115 and an appropriate source module 110 and analysis module 120. Next, the user configures test tool 100 to communicatively couple selected software filters 115 with source module 110 and analysis module 120 to create data stream 125. Test tool 100 advantageously allows the user to select a number of software filters (N) for testing. For example, FIG. 3 illustrates a configuration for testing four instantiations of software filters 115. Data stream 125 produced by source module 110 flows through each software filter 115 and network 51 via a first virtual circuit $135_1$ and a second virtual circuit $135_2$. In one embodiment, software filters $115_1$ and $115_3$ are render filters which render the data for output while software filters $115_2$ and $115_4$ are capture filters which convert the rendered data back to raw data. In this manner, test tool 100 is capable of testing numerous software filters 115 with a single computer 20 by "chaining" multiple software filters 115 via virtual circuits 135.

The system level overview of the operation of exemplary embodiments of the invention has been described in this section of the detailed description. In one embodiment, the invention allows a user to test the performance of individual kernel-mode filters by coupling the filter with a source module and an analysis module. In another embodiment, the invention facilitates testing large volumes of kernel-mode filters by chaining the filters together via virtual circuits.

Methods of an Exemplary Embodiment of the Invention

In the previous section, a system level overview of the operation of exemplary embodiments of the invention was described. In this section, the particular methods performed by the exemplary embodiments are described by reference to a flowchart. The methods to be performed by the embodiments constitute computer programs made up of computer-executable instructions. Describing the methods by reference to a flowchart enables one skilled in the art to develop such programs including such instructions to carry out the methods on suitable computing systems from computer-readable media.

Figure 4:
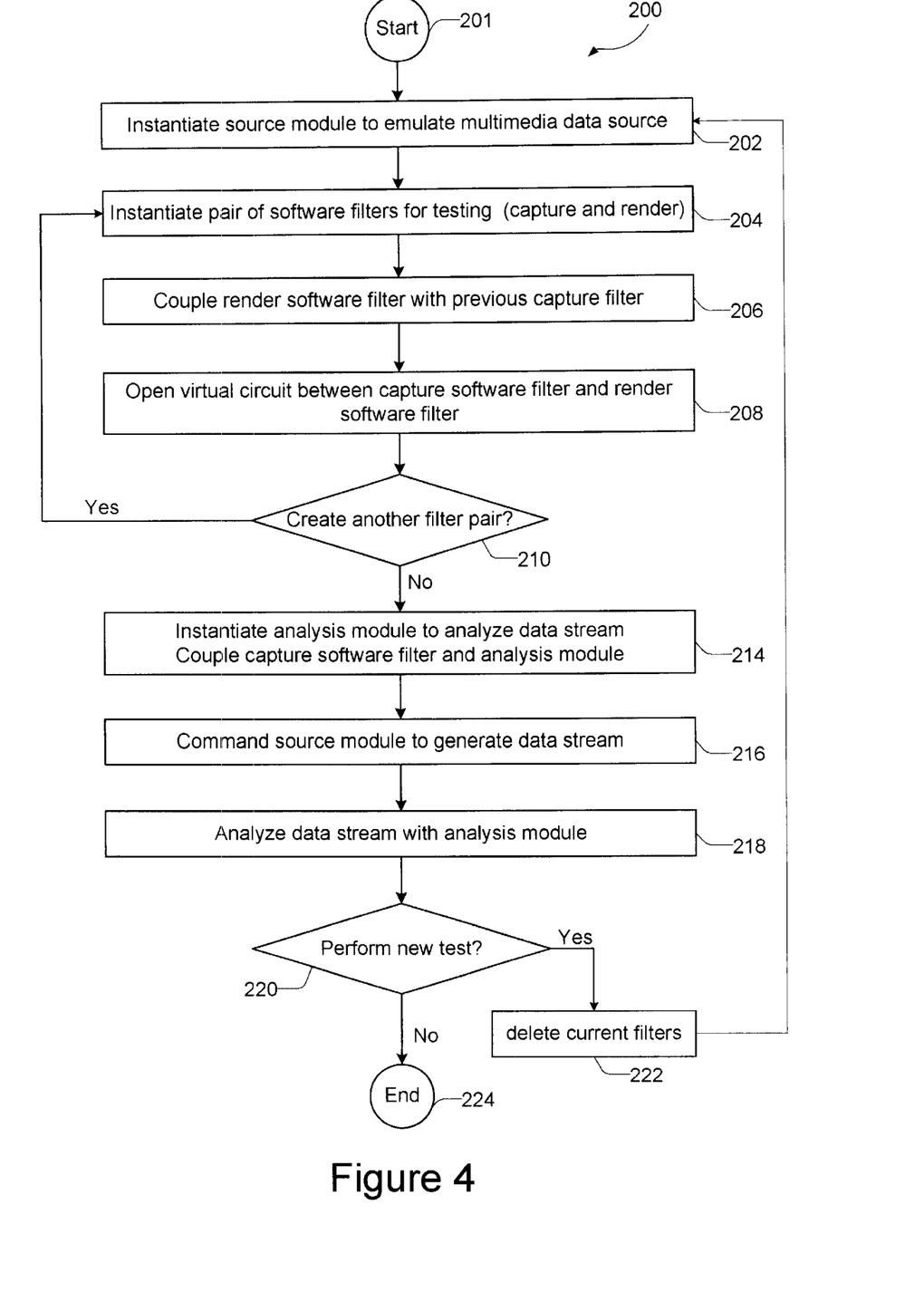
FIG. 4 is a flowchart illustrating one mode of operation of a computing system performing the inventive test method.

FIG. 4 illustrates a flowchart of one exemplary method of operation of the above-described test system according to the invention. In order to test the performance and functionality of a multimedia software filter, test tool 100 (FIG. 1) of computer 20 begins execution with step 201, immediately proceeds to step 202, and instantiates a source module 110 (FIG. 2) according to a user selection. As described above, source module 110 generates data stream 125 to emulate a multimedia input device such as a video camera or microphone. Upon instantiating source module 110, test tool 100 proceeds to step 204 and instantiates a pair of user selected software filters 115 including a render filter and a capture filter such as software filters $115_1$ and $115_2$ of FIG. 2. In step 206, test tool 100 couples render software filter $115_1$ to source module 110 such that data stream 125 produced by source module 110 is received by software filter $115_1$ without transitioning to a kernel-mode software component.

Test tool 100 proceeds from step 206 to step 208 and connects render software filter $115_1$ and capture software filter $115_2$ via virtual circuit 135 and network interface 53. In step 210, test tool 100 determines whether the user wishes to test additional software filters 115. If so, test tool jumps back to step 204 and instantiates another pair of software filters 115 and couples the new render software filter to the previously instantiated capture software filter. For example, referring to FIG. 3, in order to test additional filters test tool 100 instantiates render software filter $115_3$ and capture software filter $115_4$. Test tool 100 couples render software filter $115_3$ to previously instantiated capture software filter $115_2$. In addition, test tool 100 couples render software filter $115_3$ to capture software filter $115_4$ via virtual circuit $135_2$. Test tool 100 repeats steps 204, 206, 208 and 210 a number of times (N) according to a user configured number in order to form a chain of N pairs of software filters 115 for testing.

After creating and coupling software filters 115, test tool 100 proceeds to step 214 and instantiates analysis module 120 and couples analysis module 120 to the final software filter 115 created in step 204. For example, referring again to FIG. 3, test tool 100 couples analysis module 120 to capture software filter $115_4$.

In step 216 test tool 100 commands source module 110 to generate date stream 125 that, as illustrated in FIG. 3, flows through software filters $115_1$ network interface 53, virtual circuits 135, network 51 and ultimately to analysis module 120. Each software filter 115 processes data stream 125 and outputs the processed information to the next software filter 115 or ultimately to analysis module 120.

After commanding software filter 100 to generate date stream 125, test tool 100 proceeds to step 218 and commands analysis module 120 to analyze data stream 125. Analysis module 120 includes statistical measuring capabilities to sample data stream 125 and provide quantitative results to test tool 100 as described above. Test tool 100 displays the results to the user. After viewing the results, test tool 100 allows the user to initiate a new test, thereby proceeding from step 220 to step 222. If a new test is desired, test tool 100 deletes all of the current software modules and filters 110, 115 and 120 in step 222 and loops back to step 202. If the user does not wish to perform another test, test tool 100 proceeds from step 220 to step 224 and terminates.

The particular methods performed by test tool 100 of various exemplary embodiments of the invention have been described. The method performed by test tool 100 has been shown by reference to a flowchart including all the steps from 201 until 224.

Conclusion

A method and system for testing software filters used to support kernel streaming in a multimedia environment have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that, in one embodiment, the invention allows a user to assess individual kernel-mode filters by coupling the filter with a source module and an analysis module. In another embodiment, the invention facilitates testing a large number of software filters with a single computer by chaining the filters together via virtual circuits. Furthermore, those of ordinary skill within the art will appreciate that although the invention is described in reference to testing kernel-mode software filters, the invention is readily applicable to testing any software filter that is required to support a large number of data streams or network connections. Therefore, is manifestly intended that this invention be limited only by the following claims and equivalents thereof.

We claim:

1. A computing system comprising:
    a source module generating a multimedia data stream to emulate a multimedia input device;
    a plurality of software filters used for kernel data streaming and communicatively coupled to form a chain of software filters, wherein the chain of software filters receives the multimedia data stream from the source module and propagates the data stream through each software filter for processing; and an analysis module receiving the processed data stream from the chain of software filters, wherein the analysis module produces performance information as a function of the received data stream.

2. The computing system of claim 1, wherein the source module, the analysis module and each software filter operate in a kernel-mode.

3. The computing system of claim 1, further including a software test tool for configuring the chain of software filters.

4. The computing system of claim 3, wherein the software test tool constructs the chain of software filters to include N software filters based on a user command.

5. The computing system of claim 3, wherein the software test tool selects the source module from a set of source modules based on a user command.

6. The computing system of claim 3, wherein the analysis module communicates the performance information to the software test tool, and further wherein the software test tool displays the performance information to a user.

7. The computing system of claim 1, wherein at least two of the software filters are communicatively coupled via a virtual circuit operating in a loop-back mode so as to transmit the data stream to a network and receive the data stream from the network.

8. The computing system of claim 3, further including a plurality of proxy filters executing in a non-kernel mode, wherein the software test tool configures each software filter via a corresponding proxy filter.

9. The computing system of claim 1, wherein the plurality of software filters includes one or more software filter pairs including a capture filter and a render filter, wherein each render filter renders the data stream for output by a multimedia output device, and further wherein each capture filter converts the rendered data stream into a raw data stream representing data captured by a multimedia input device.

10. A computing method for testing software filters for use in kernel-mode data streaming, said method comprising the steps of:

communicatively coupling a plurality of software filters used for kernel data streaming to form a chain of software filters;

generating a multimedia data stream with a source module to emulate a multimedia input device;

propagating the data stream through each software filter to process the data stream; and analyzing the processed data stream with an analysis module to produce performance information as a function of the processed data stream.

11. The computing method of claim 10, further including operating the source module, the analysis module and the software filters in a kernel-mode.

12. The computing method of claim 10, further including configuring the chain of software filters with a software test tool.

13. The computing method of claim 12, wherein configuring the chain of software filters includes constructing the chain of software filters with the software test tool to include N software filters based on a user command.

14. The computing method of claim 12, wherein configuring the chain of software filters includes selecting the source module from a set of source modules based on a user command.

15. The computing method of claim 12, wherein analyzing the processed data stream includes communicating the performance information to the software test tool for presentment to a user.

16. The computing method of claim 10, wherein coupling the software filters includes coupling at least two of the software filters via a virtual circuit operating in a loop-back mode, and further wherein propagating the data stream includes:

transmitting the data stream to a network via the virtual circuit; and receiving the data stream from the network via the virtual circuit.

17. The computing method of claim 13 wherein configuring the chain of software filters includes controlling each software filter via a corresponding proxy filter executing in a non-kernel mode.

18. A computer-readable medium having computer-executable instructions to cause a computer to perform a method comprising the steps of:

communicatively coupling a plurality of software filters used for kernel data streaming to form a chain of software filters;

generating a multimedia data stream with a source module to emulate a multimedia input device;

propagating the data stream through each software filter to process the data stream; and analyzing the processed data stream with an analysis module to produce performance information as a function of the processed data stream.

19. The computer-readable medium of claim 18, further including instructions for operating the source module, the analysis module and the software filters in a kernel-mode.

20. The computer-readable medium of claim 18, further including instructions for configuring the chain of software filters with a software test tool.

21. The computer-readable medium of claim 20, wherein configuring the chain of software filters includes constructing the chain of software filters with the software test tool to include N software filters based on a user command.

22. The computer-readable medium of claim 20, wherein configuring the chain of software filters includes selecting the source module from a set of source modules based on a user command.

23. The computer-readable medium of claim 20, wherein analyzing the processed data stream includes communicating the performance information to the software test tool for presentment to a user.

24. The computer-readable medium of claim 18, wherein coupling the software filters includes coupling at least two of the software filters via a virtual circuit operating in a loop-back mode, and further wherein propagating the data stream includes:

transmitting the data stream to a network via the virtual circuit; and receiving the data stream from the network via the virtual circuit.

25. The computer-readable medium of claim 20 wherein configuring the chain of software filters includes controlling each software filter via a corresponding proxy filter executing in a non-kernel mode.

26. A computer program for performing performance analysis on multimedia filters, the computer program being stored on a machine readable medium and comprising:

a source module that generates a multimedia data stream to emulate a multimedia input device;

a plurality of software filters used for kernel data streaming, the software filters coupled to form a chain of software filters that receive the data stream from the source module and propagates the data stream through each software filter and an analysis module receiving the processed data stream from the chain of software filters, wherein the analysis module produces performance information as a function of the received data stream.

27. The computer program of claim 26 and further comprising a plurality of virtual circuit modules that emulate external connections between the plurality of software filters.

* * * * *